United States Patent Office 3,499,854
Patented Mar. 10, 1970

3,499,854
PHENOL-METHACRYLALDEHYDE VARNISH RESINS
Robert W. Hill, Leawood, and James H. Rea, Olathe, Kans., assignors to Gulf Research & Development Company, Pittsburgh, Pa., a corporation of Delaware
No Drawing. Filed Apr. 24, 1967, Ser. No. 632,932
Int. Cl. C08g 5/00; C09d 3/54
U.S. Cl. 260—19                                4 Claims

ABSTRACT OF THE DISCLOSURE

Resins which contain reactive aldehyde structures and are employed in thermally curable coating compositions for production of tough, abrasion-resistant finishes are made by condensing one mole of phenol or cresol with from one to three moles of methacrylaldehyde under acid conditions at temperatures ranging from ambient to about 100° C.

SUMMARY OF INVENTION

Phenol-formaldehyde condensation products have been employed as varnish resins as well as for various other purposes. These resins have left something to be desired with respect to their ability to be cured so as to contribute tough, abrasion-resistant characteristics to coatings. Other resins containing reactive substituents which facilitate curing to highly cross-linked, high molecular weight coatings have been found more desirable in many applications.

The condensation of phenol with acrylaldehyde has been investigated in the past in an effort to produce reactive, curable resins. However, condensation appears to occur by means of a multiplicity of competing concurrent reactions with somewhat erratic results. Acrylaldehyde appears to have a tendency to react in any or all of three reactive sites and to carry the condensation beyond the point at which useful resins are obtained. Dark colored tars are the usual condensation products.

Methacrylaldehyde, however, differs significantly from acrylaldehyde both in chemical structure and reactivity. It has been discovered that methacrylaldehyde in proportions of one to three moles per mole of phenol will undergo an easily controlled acidic condensation to yield light colored products of consistent quality. These products may be used to manufacture drying oil varnishes which yield cured coatings of good solvent and abrasion resistance.

According to this invention, useful resins are made by reacting from one to three moles and preferably about two moles of methacrylaldehyde with phenol or a cresol in the presence of an acidic condensation catalyst at a temperature ranging up to about 100° C., conveniently about 60° to 80° C.

The preferred products are solid, from light yellow in color to substantially colorless and are soluble in alcohols, ether-alcohols, ketones and esters which are commonly employed as industrial solvents. Molecular weights generally are between 300 and 500. The products are substantially free of olefinic unsaturation and possess both hydroxy groups and aldehyde carbonyl structures, as indicated by infrared absorption.

The resin products are easily utilized in varnish and enamel manufacture by reaction with drying oils at elevated temperatures according to well-known procedures. (See, for example, "Paint and Varnish Technology," W. von Fischer, Editor, Reinhold Pub. Corp., 1948, for discussion of varnish and enamel manufacturing procedures and apparatus.)

DETAILED DESCRIPTION

The acidic condensation of phenol or a cresol with 1 to 3 moles of methacrylaldehyde appears to be principally by means of a reaction which may be characterized as alkylation by an olefin. When the reaction is conducted in either an aqueous or anhydrous system the products are very similar and exhibit infrared absorption which is characteristic of compositions containing both hydroxy and aldehyde carbonyl groups. Infrared absorption which is characteristic of carbon-to-carbon double bonds is substantially absent from the condensation products. Molecular weight and other characteristics may be varied to some extent by change of time and temperature of reaction. Following are illustrative examples of condensation under both aqueous and anhydrous conditions.

EXAMPLE I

One gram of concentrated hydrochloric acid was added to a solution of 14.0 g. (0.2 mole) of methacrylaldehyde and 21.4 g. (0.2 mole) of 88 percent aqueous phenol. The temperature rose to 44° C., remained at this temperature for about an hour, then slowly fell. After a total of 6 hours, the mixture was steam distilled. The residue was refluxed with 100 ml. of benzene until no more water was removed, then the benzene solution was added to 1 liter of hexane. This caused separation of 16.5 g. of taffy-like material. The infrared spectrum of the produce showed strong hydroxyl and aldehyde carbonyl absorptions.

EXAMPLE II

A solution of 7.0 g. (0.1 mole) of methacrylaldehyde in 20 ml. of benzene was added dropwise with stirring to a solution of 9.4 g. (0.1 mole) of phenol in 50 ml. of benzene which had been treated previously with hydrogen chloride. The addition was carried out in 15 min. during which time the temperature rose to 30°. After 2 hr. more hydrogen chloride was bubbled into the reaction solution which was then heated under reflux for 2 hr. No water was collected, indicating no further condensation reaction. Steam distillation left a dark syrup which became a glossy solid on standing. Its infrared spectrum had strong absorptions for both hydroxyl and carbonyl indicating the main reaction is the same whether aqueous or anhydrous phenol is used.

EXAMPLES III–VIII

The results obtained from a series of reactions designed to determine effects of different reactant ratios and reaction temperatures for the formation of a methacrylaldehyde-phenol resin are shown in Table I. In all cases the reactants were combined in the ratios shown and treated for six hours. The reaction mixtures were then steam-distilled to remove any unchanged reactants. Thin-layer chromatograms of the crude products indicated they were mixtures of at least six different components, some of which probably differ only in molecular weight. The infrared spectra of all the resins were essentially the same.

On examining the phenolic hydroxyl content of the resins, it can be seen that it is higher for the lower reaction temperature. The amount of phenol in these resins is about 35 percent for the 60° C. reaction temperature and drops to 25 percent for the 80° C. reaction temperature. The molecular weights appear to be generally higher for the higher reaction temperature. However, the molecular weight values as determined are somewhat low due the the presence of water and some other low molecular weight materials in the samples. These data indicate the best resins are obtained with a 2:1 mole ratio of methacrylaldehyde to phenol at about 80° C. This resin is a solid, is light in color when made in the absence of oxygen and is easy to handle in manufacture of curable varnish and enamel compositions according to conventional procedures.

TABLE I.—ANALYSIS OF PHENOL-METHACRYLALDEHYDE REACTION PRODUCTS

| Example No. | MA/Phenol, Mole Ratio [a] | Cent. Temp.,: Degrees | Percent H₂O in— | | Dry Weight (g.) [d] | Percent Phenolic Hydroxyl | Molecular Weight ($\overline{M}_n$) [f] |
|---|---|---|---|---|---|---|---|
| | | | Wet Product | Dry Product | | | |
| 3 | 1:1 | 60 / [c] (64) | 4.38 | 1.20 | 66 | 6.21 / [e] (7.10) | 448 |
| 4 | 2:1 | 60 | 6.10 | 0.50 | 80 | 6.78 / (5.68) | 319 |
| 5 | 3:1 | 58–60 | | 1.87 | 63 | 6.50 | 283 |
| 6 | 1:1 | 78–81 / [c] (86) | 10.98 | 4.15 | 66 | 5.94 / (5.44) | 325 |
| 7 | 2:1 | 78–81 | 9.66 | 0.60 | 102 | 4.63 / (4.15) | 401 |
| 8 | 3:1 | 78–80 | 8.56 | 2.81 | 95 | 4.88 / (5.36) | 360 |

[a] One-half mole of 88% aqueous phenol and 2 mole percent of conc. hydrochloric acid.
[b] Six hour heating period.
[c] Max. temp. reached during exotherm.
[d] Drying was accomplished under reduced pressure, employing a vacuum pump for several hours.
[e] Figures in parentheses were obtained from wet samples.
[f] Number average molecular weight by vapor pressure osomometer method.

EXAMPLE IX

Varnishes were prepared based on a methacrolein-phenol condensation product illustrated in Example VII with tung oil and with tung oil-linseed oil combinations. The oil lengths of varnishes prepared were 50 gal., 25 gal. and 12.5 gal.

The varnishes were prepared by heating the oil and resin (see Table II for composition) to 288–300° C. until an oil drop which remained clear on cooling was obtained. The varnish was then thinned with xylene to give a product having 60 percent solids. Film property studies of cured coatings of these varnishes on solid substrates yielded the data in Tables III and IV.

TABLE II.—PREPARATION OF METHACRYLALDEHYDE-PHENOL ADDUCT DRYING OIL VARNISHES

| | 1 | 2 | 3 | 4 | 5 | 6 |
|---|---|---|---|---|---|---|
| Resin | 50.0 | 50.0 | 50.0 | 50.0 | 50.0 | 50.0 |
| Tung oil | 97.5 | 195.0 | 48.75 | 116.0 | 29.0 | 58.0 |
| Linseed oil | | | | 80.0 | 20.0 | 39.7 |

EXAMPLE X

A dehydrated castor oil monoglyceride was prepared by heating dehydrated castor oil with glycerol in the presence of a lead oxide catalyst. To a resin flask was charged 106.2 g. of the monoglyceride along with 69.6 g. of a methacrylaldehyde-phenol resin made according to Example 7, 10 ml. of xylene and 2.1 ml. of isooctyl acid phosphate. The reaction mixture was stirred and heated under a nitrogen atmosphere to 160° C. Water then began to distill over. The temperature was raised slowly to 270° C. during a period of 6.5 hours, a total of 7.6 ml. of water being distilled off, yielding a clear, viscous, curable coating resin.

Three coating formulations were prepared from the resin product. In each case, the solvent used was 3/1, xylene/Cellosolve. One contained 0.65 percent zinc and 0.05 percent cobalt (based on solids), the second contained 0.65 percent zinc and 0.10 percent cobalt, and the third contained 0.10 percent manganese. Two test tubes and two large glass microscope slides were dip-coated from each solution and cured at 300° F. for 30 minutes. Two additional test tubes and slides were cured at 350° F. for 30 minutes. The test tubes were tested for resist- TABLE III.—SOLUTION AND FILM PROPERTIES OF METHACRYLALDEHYDE-PHENOL DRYING OIL VARNISH

| Varnish No. | Oil | Oil Length, Gals. | Viscosity [b] Gardner-Holdt Tube | Film Appearance [c] | |
|---|---|---|---|---|---|
| | | | | Air Dried [d] | Baked [d,e] |
| 1 | Tung | 12.5 | <A | Clear film | Clear film. |
| 2 | do | 25.0 | E–F | Wrinkled films | Wrinkled films. |
| 3 | do | 50.0 | H | do | Do. |
| 4 | Tung-Linseed [a] | 12.5 | B–C | Clear film | Clear film. |
| 5 | do [a] | 25.0 | B | do | Do. |
| 6 | do [a] | 50.0 | B–C | do | Do. |

[a] Tung-Linseed ratio 3:2.
[b] At 60% nonvolatiles in xylene.
[c] Dry film thickness 1.5 mil.
[d] Dryer combination employed 0.5% Pb, 0.05% Co, 0.02% Mn.
[e] Baking schedule 150° C. and 30 min.

TABLE IV.—PHYSICAL PROPERTIES AND CHEMICAL RESISTANCE OF METHACRYLALDEHYDE-PHENOL DRYING OIL VARNISH FILMS

| Varnish No. | Oil Length, Gals. | Adhesion [c] Scotch Tape | | Sward Hardness [d] | | Chemical Resistance [c] | | | |
|---|---|---|---|---|---|---|---|---|---|
| | | | | | | Acetone [a] | | 2% NaOH [b] | |
| | | Air Dried | Baked | Air Dried | Baked | Air Dried | Baked | Air Dried | Baked, hrs. |
| 1 | 12.5 | Pass | Pass | 32 | 50 | 10 | NF | 60 | >72 |
| 2 | 25.0 | do | do | 15 | (*) | 28 | NF | 45 | >72 |
| 3 | 50.0 | Fail | do | 4 | (*) | 36 | NF | 10 | >72 |
| 4 | 12.5 | Pass | do | 26 | 45 | 12 | 28 | 3 | >72 |
| 5 | 25.0 | do | do | 13 | 24 | 22 | 35 | 1 | >72 |
| 6 | 50.0 | Fail | do | 5 | (*) | 10 | NF | 1 | >72 |

[a] Seconds to fail.
[b] Minutes to fail.
[c] Test conducted on Steel Q panels.
[d] Test conducted on glass plate.
*Films were wrinkled. Hardness could not be determined by the test method.

NOTE.—NF=No failure (acetone evaporated).

ance to 5 percent NH₄OH and ethanol by immersion. The microscope slides were used for pencil hardness determination and for abrasion resistance tests, using the RCA Abrasion tester. The data are presented in Tables V and VI below.

TABLE V

| Coating Formulations | 1 | 2 | 3 |
|---|---|---|---|
| Resins solids (g.) | 20 | 20 | 20 |
| Xylene (g.) | 15 | 15 | 15 |
| Cellosolve (g.) | 5 | 5 | 5 |
| 16% zinc drier (g.)[1] | 0.67 | 0.67 | |
| 12% cobalt drier (g.)[1] | 0.084 | 0.168 | |
| 6% manganese drier (g.)[1] | | | 0.34 |

[1] Liquid driers, available as articles of commerce, of the type commonly employed in paint and varnish manufacture.

TABLE VI.—PROPERTIES OF COATINGS MADE WITH FORMULATIONS CONTAINING COATING RESIN MADE FROM METHACROLEIN-PHENOL CONDENSATE AND DEHYDRATED CASTOR OIL MONOGLYCERIDE (Cure time, 30 min.)

| | Resistance (min.) | | | | Abrasion Resistance [1] | | Pencil Hardness | |
|---|---|---|---|---|---|---|---|---|
| | 5% NH₄OH | | Ethanol | | | | | |
| Cure Temp. (° F.) | 300 | 350 | 300 | 350 | 300 | 350 | 300 | 350 |
| Resin Formulation: | | | | | | | | |
| 1 | T | T | T | T | T | T | T | T |
| 2 | T | 7 | T | 1 | T | T | T | T |
| 3 | 37 | 160 | 1.5 | 1.5 | 28 | 44 | 2H | 2H |

[1] Strokes of RCA abrasion tester.
NOTE.—T means coating was tacky.

The data indicate that only the formulation containing the manganese drier cured to a hard, durable coating, the other coatings remaining tacky after curing. The cured coatings based on the combination of phenol-methacrylaldehyde resin and dehydrated castor oil monoglyceride are particularly useful in applications which require toughness, flexibility and resistance to repeated heating, as for example the enameling of wire which is used in electric motors.

What is claimed is:
1. A heat curable varnish composition consisting essentially of the product obtained by heating a drying oil with a resin which is a product of condensation of methacrylaldehyde with phenol in the presence of an acid catalyst in the proportion of one to three moles of methacrylaldehyde per mole of phenol, said varnish composition having an oil length of from about 12.5 to 50.
2. A heat-curable coating composition consisting essentially of the product obtained by heating dehydrated castor oil monoglyceride with a resin which is a product of condensation of methacrylaldehyde with phenol in the presence of an acid catalyst in the proportion of about two moles of methacrylaldehyde per mole of phenol, in combination with a solvent and a manganese drier.
3. A heat-cured film on a solid substrate of a composition consisting essentially of the product obtained by heating a drying oil with a resin which is a product of condensation of methacrylaldehyde with phenol in the presence of an acid catalyst in the proportion of about two moles of methacrylaldehyde per mole of phenol.
4. A heat-cured film on a solid substrate of a composition consisting essentially of the product obtained by heating dehydrated castor oil monoglyceride with a resin which is a product of condensation of methacrylaldehyde with phenol in the presence of an acid catalyst in the proportion of about two moles of methacrylaldehyde per mole of phenol.

References Cited

UNITED STATES PATENTS 2,809,178  10/1957  Turner et al. _____ 260—55
2,885,385  5/1959   Farnham _____ 260—55

FOREIGN PATENTS 547,329  8/1942  Great Britain.

OTHER REFERENCES

Simonds et al., "Handbook of Plastics," 1949, TP 986 A2S48 C. 2, (pages 413 and 414 relied on).

Maksorow et al., "Industrial and Engineering Chemistry," 1932 (pp. 827 to 833 relied on).

DONALD E. CZAJA, Primary Examiner

W. E. PARKER, Assistant Examiner

U.S. Cl. X.R.

117—132, 161; 260—51, 55